United States Patent
Asaumi et al.

(10) Patent No.: US 7,154,244 B2
(45) Date of Patent: Dec. 26, 2006

(54) STEERING APPARATUS

(75) Inventors: Hisao Asaumi, Wako (JP); Osamu Tsurumiya, Wako (JP); Hirokazu Kitazawa, Wako (JP); Shinji Suto, Wako (JP); Junichi Yoshida, Wako (JP); Tomoaki Sugano, Wako (JP); Fumihiro Morishita, Wako (JP); Hiroaki Horii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/691,725

(22) Filed: Oct. 22, 2003

(65) Prior Publication Data

US 2004/0080295 A1   Apr. 29, 2004

(30) Foreign Application Priority Data

Oct. 24, 2002 (JP) .............................. 2002-310325

(51) Int. Cl.
*G05B 11/28* (2006.01)
(52) U.S. Cl. ............... 318/599; 318/811; 318/607; 318/78; 318/807; 701/41; 180/443
(58) Field of Classification Search .......... 318/254, 318/437, 599, 811, 255, 268, 580; 180/443–446; 388/811
See application file for complete search history.

(56) References Cited

U.S. PATENT DOCUMENTS

| | | | | | |
|---|---|---|---|---|---|
| 4,471,273 | A | * | 9/1984 | Melocik et al. ............... 318/55 |
| 5,065,078 | A | * | 11/1991 | Nao et al. ..................... 318/16 |
| 5,142,468 | A | * | 8/1992 | Nerem .......................... 363/71 |
| 5,162,707 | A | * | 11/1992 | Joseph ......................... 318/60 |
| 5,435,155 | A | * | 7/1995 | Paradis ......................... 62/515 |
| 5,451,852 | A | * | 9/1995 | Gusakov .................... 318/611 |
| 5,453,930 | A | * | 9/1995 | Imaseki et al. ................ 701/22 |
| 5,481,460 | A | * | 1/1996 | Masaki et al. ................ 701/50 |
| 5,506,484 | A | * | 4/1996 | Munro et al. ................ 318/599 |
| 5,554,914 | A | * | 9/1996 | Miyazawa .............. 318/568.11 |
| 5,818,193 | A | * | 10/1998 | Sasaki ......................... 318/685 |
| 5,859,510 | A | * | 1/1999 | Dolan et al. ................. 318/254 |
| 5,903,112 | A | * | 5/1999 | Yamada et al. ............... 318/10 |
| 5,942,862 | A | * | 8/1999 | Yamada et al. ................. 318/9 |
| 6,008,599 | A | * | 12/1999 | Beck .......................... 318/254 |
| 6,348,911 | B1 | * | 2/2002 | Rosenberg et al. ......... 345/161 |
| 6,373,217 | B1 | * | 4/2002 | Kawada et al. ............. 318/564 |
| 6,388,405 | B1 | * | 5/2002 | Laurent ...................... 318/254 |
| 6,394,218 | B1 | * | 5/2002 | Heitzer ....................... 180/402 |
| 6,400,116 | B1 | * | 6/2002 | Chen et al. ................. 318/599 |
| 6,497,303 | B1 | * | 12/2002 | Nishimura et al. ......... 180/446 |
| 6,505,700 | B1 | * | 1/2003 | Furumi et al. .............. 180/412 |
| 6,687,590 | B1 | * | 2/2004 | Kifuku et al. ................ 701/43 |

(Continued)

FOREIGN PATENT DOCUMENTS

| | | |
|---|---|---|
| JP | 2001-151125 A | 6/2001 |
| JP | 2001-260908 | 9/2001 |
| WO | WO 99/29557 | 6/1999 |

*Primary Examiner*—Lincoln Donovan
*Assistant Examiner*—Renata McCloud
(74) *Attorney, Agent, or Firm*—Hamre, Schumann, Mueller & Larson, P.C.

(57) ABSTRACT

Steering apparatus includes at least one motor for generating a steering assisting force in a direction to steer a steerable wheel, two drive circuits having respective switching elements for PWM-controlling the motor, and a controller for differentiating, between the drive circuits, a control frequency at which the switching element is switched on and off. The differentiated PWM switching timing can effectively reduce switching noise and magnetostrictive sound of the motor.

9 Claims, 11 Drawing Sheets

U.S. PATENT DOCUMENTS 6,762,745 B1 * 7/2004 Braun et al. ................. 345/156
6,776,252 B1 * 8/2004 Andonian et al. .......... 180/402
6,794,836 B1 * 9/2004 Strothmann et al. ........ 318/268

* cited by examiner (1a) REFERENCE TRIANGULAR WAVE 76a (2a) REFERENCE TRIANGULAR WAVE 77a (1b) SIGNAL 76b PWM-b (e.g., 18KHz)

(2b) PWM-a (e.g., 20KHz) SIGNAL 77b (1a) REFERENCE TRIANGULAR WAVE 100a (2a) REFERENCE TRIANGULAR WAVE 101a (1b) SIGNAL 100b PWM-b (2b) PWM-a SIGNAL 101b (1) REFERENCE TRIANGULAR WAVE 400a (2) REFERENCE TRIANGULAR WAVE 400b (3) REFERENCE TRIANGULAR WAVE 400c (1) REFERENCE TRIANGULAR WAVE 500a (2) REFERENCE TRIANGULAR WAVE 500b (3) REFERENCE TRIANGULAR WAVE 500c

STEERING APPARATUS

FIELD OF THE INVENTION

The present invention relates generally to steering apparatus, and more particularly to a steering apparatus including at least one steering assisting motor and two drive circuits for driving the motor.

BACKGROUND OF THE INVENTION

Among the conventionally-known steering apparatus are electric power steering apparatus and steer-by-wire steering systems. As well known, the electric power steering apparatus are steering assisting apparatus which are designed to activate an electric motor (steering assisting motor) as a human operator or driver manually operates the steering wheel, during driving of a motor vehicle, to thereby assist the driver's manual steering effort. In such electric power steering apparatus, the steering assisting motor, which provides a steering torque assist, is controlled by a motor control section (ECU), using a steering torque signal generated by a steering torque detection section detecting steering torque that is produced on the steering shaft by driver's operation of the steering wheel and a vehicle velocity signal generated by a vehicle velocity detection section detecting a traveling velocity of the vehicle, so as to reduce manual steering force to be applied by the human driver. Specifically, to control the steering assisting motor, the motor control section sets a target value of a motor current to be supplied to the motor on the basis of the above-mentioned steering torque signal and vehicle velocity signal, and then it calculates a difference or offset between the thus-set target current value and a value of a motor current detection signal fed back from a motor current detection section that detects a motor current to actually flowing through the motor. Then, the motor control section performs a proportional/integral compensating process (PI control) on an offset signal representative of the calculated offset, to thereby generate a signal for controlling driving of the steering assisting motor.

The electric power steering apparatus have been developed so far primarily for compact vehicles. However, in recent years, there has also arisen a need for large-sized vehicles (e.g., passenger cars with a displacement of 2,000 cc or over) to be provided with electric power steering apparatus, with a view to achieving reduced fuel cost, increased vehicle control range, etc. In the case of large-sized vehicles provided with an electric power steering apparatus having a single steering assisting motor, the steering assisting motor has to be a high-power motor capable of providing a great steering assisting force, due to a vehicle's great weight. Therefore, the size of the steering assisting motor tends to increase, and the increased size would result in lowered flexibility in a mounting layout (lowered mountability) of the motor on the vehicle body. Further, such large-sized vehicles require a non-standardized, dedicated steering assisting motor and a motor control drive section therefor, which would result in increased manufacturing costs. To avoid the inconveniences, there have been proposed, in, for example, Japanese National Laid-Open Publication No. 2001-525292 and Japanese Patent Laid-Open Publication No. 2001-260908 and No. 2001-151125, more sophisticated electric power steering apparatus suitable for large-sized vehicle, which include two steering assisting apparatus.

Generally, the conventional electric power steering apparatus comprise a sensor unit including a steering torque diction section etc. an ECU including a CPU, motor drive circuitry, etc., and an electronic drive control unit including current supply elements for supplying a motor current from the ECU to the steering assisting motor. Further, in case a failure occurs in any of the ECU and motor-driving electronic drive control unit, the conventional electric power steering apparatus illuminate a warning lamp via a display panel disposed in front of a driver's seat or the like on the basis of fail-safe control, and, if the steering force assist control can not be performed completely, the steering apparatus are shifted to a normal steering mode based on driver's manual operation alone.

In recent years, there has been a demand that, even when a failure has occurred as noted above, the electric power steering apparatus be appropriately maintained in operative condition to keep assisting the manual steering effort of the driver. For that purpose, the steering apparatus may be constructed to redundantly include two motor drive circuits so that the apparatus can keep assisting the manual steering effort even when a failure has occurred in the motor-driving electronic drive control unit or the like.

However, such electric power steering apparatus redundantly including two motor drive circuits would present the following inconveniences. It is ordinary today to control the steering assisting motor by means of a PWM (Pulse Width Modulation) control scheme using FETs of the motor drive circuit as switching elements, which would however produce greater switching noise and magnetostrictive sound as the current input to the switching elements and the switching speed of the switching elements increase. The greater switching noise and magnetostrictive sound would lower the merchantability of vehicles equipped with the electric power steering apparatus. Thus, in the case of the electric power steering apparatus with two motor drive circuits, adverse influences of the switching noise and magnetostrictive sound resulting from the PWM control would become more significant because each of the two motor drive circuits produces such switching noise and magnetostrictive sound. These inconveniences commonly occur in steering apparatus including two motor drive circuits, irrespective of whether the steering assisting motors are of the brushless type or brushed type.

SUMMARY OF THE INVENTION

In view of the foregoing prior art problems, it is an object of the present invention to provide a steering apparatus including two motor drive circuits which can effectively reduce unwanted switching noise and magnetostrictive sound that would be produced by driving of a steering assisting motor through great current switching at high speed.

In order to accomplish the above-mentioned object, the present invention provides an improved steering apparatus, which comprises: at least one motor for generating a steering assisting force in a direction to steer a steerable wheel; two drive circuits for PWM-controlling the motor, each of the motor drive circuits including a switching element; and a controller for differentiating, between the motor drive circuits, a control frequency at which the switching element is switched on and off.

With the arrangement that the control frequency, at which the switching element is switched on and off, is controlled to differ between the two motor drive circuits, the PWM switching of the switching elements of the motor drive circuits can be prevented from occurring at the same timing. As a consequence, the present invention can effectively reduce the peaks of the switching noise levels by virtue of level distribution attained by the differentiated switching timing of the switching elements.

According to another aspect of the present invention, there is provided a steering apparatus comprising: at least one motor for generating a steering assisting force in a direction to steer a steerable wheel; two drive circuits for PWM-controlling the motor, each of the motor drive circuits including a switching element; and a controller for differentiating, between the motor drive circuits, a phase of a pulse signal for switching on and off the switching element.

With the arrangement that the phase of the pulse signal for switching on and off the switching element is caused to differ between the motor drive circuits, the PWM switching of the switching elements of the motor drive circuits can be prevented from occurring at the same timing. As a consequence, the present invention can effectively reduce the peaks of the switching noise levels by virtue of level distribution attained by the differentiated switching timing of the switching elements.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

It should be appreciated that various construction, shapes, sizes, positions, etc. to be referred to in the following description are merely for illustrative purposes to enable those of ordinary skill in the art to understand and carry out the present invention. Therefore, the present invention should never be construed as restricted to embodiments to be described hereinbelow, and it may be modified variously without departing from the scope defined by the appended claims.

Figure 1:
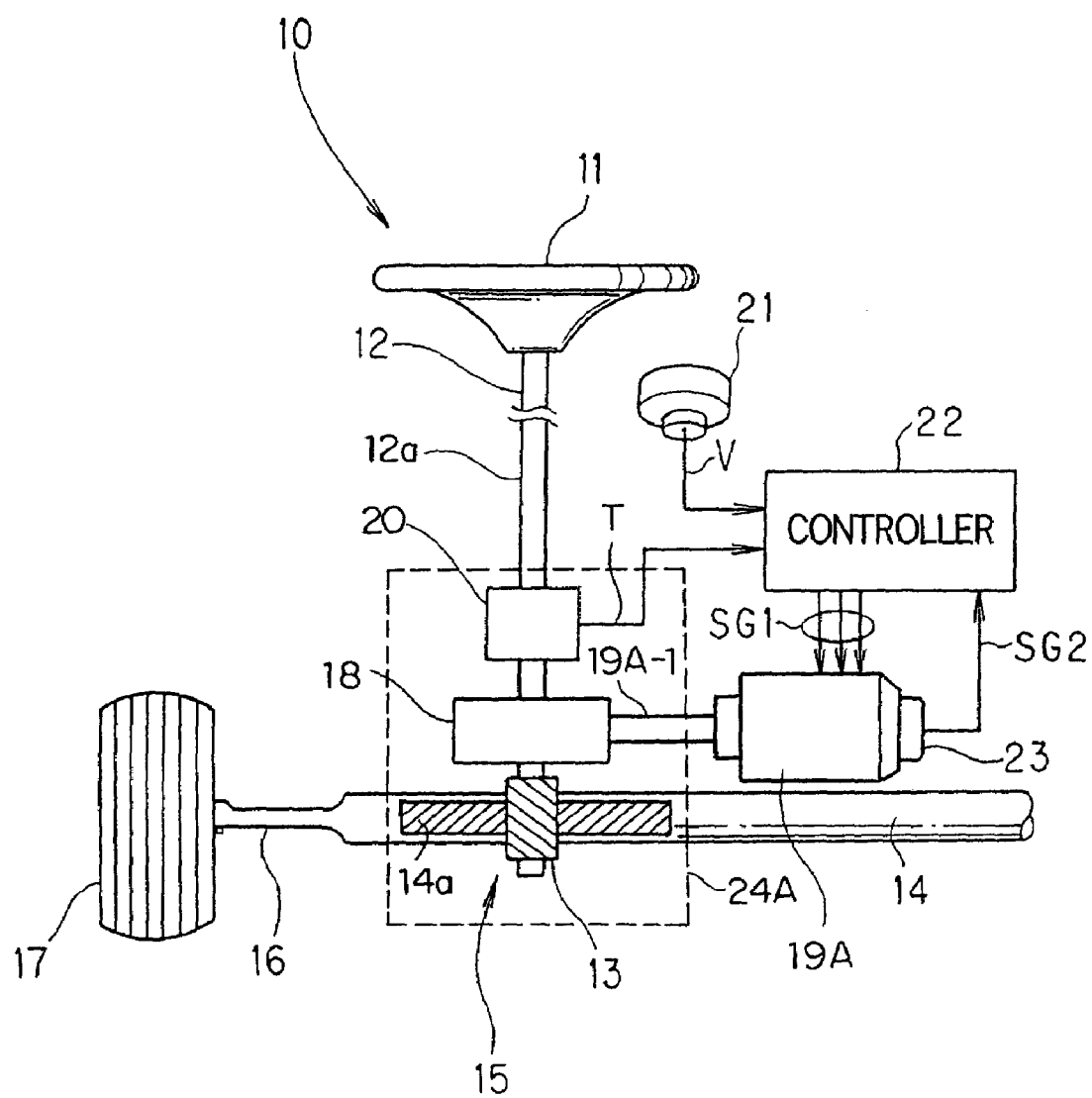
FIG. 1 is a view conceptually showing a fundamental structure of a dual-motor-type electric power steering apparatus.
Figure 2:
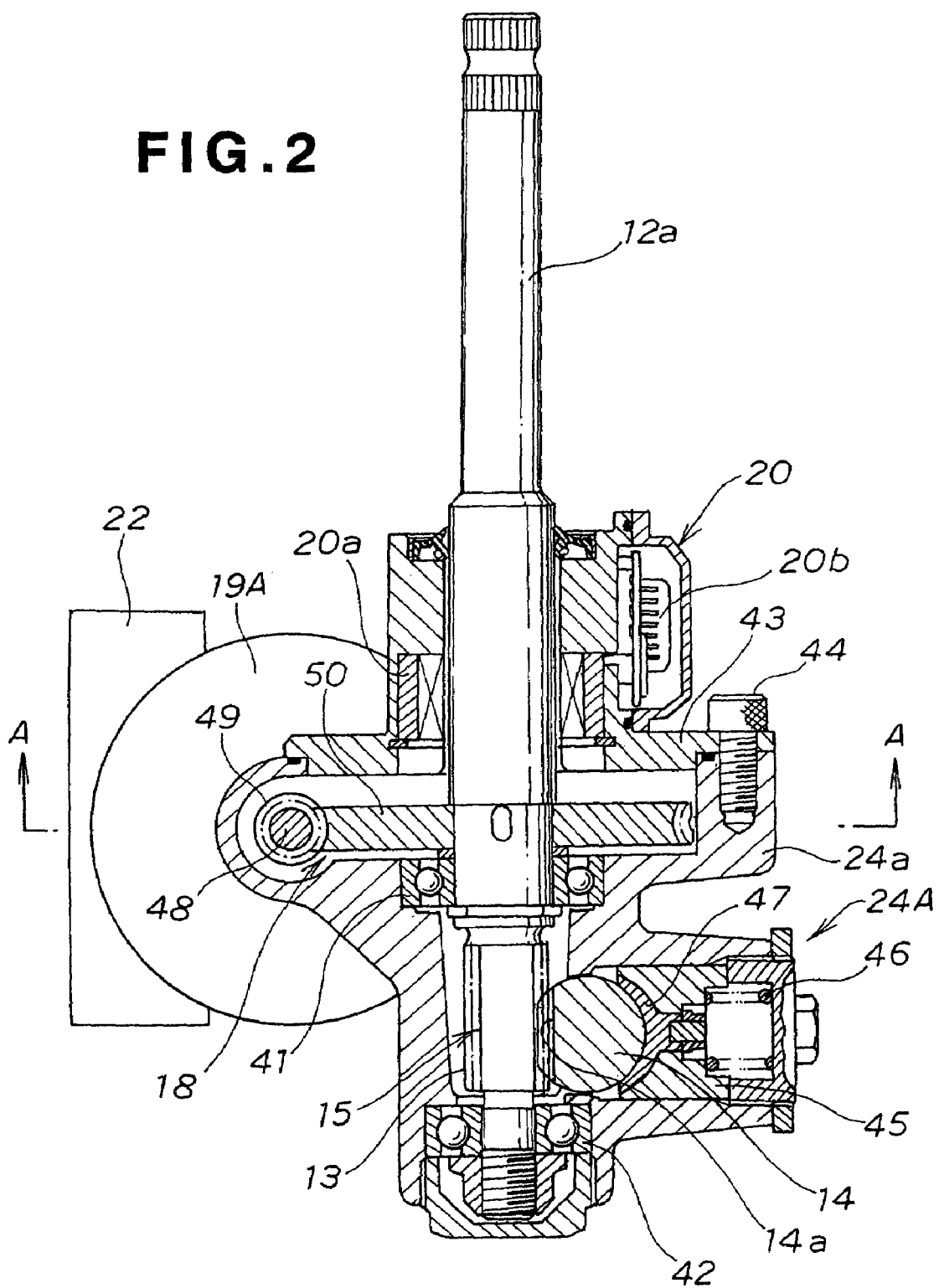
FIG. 2 is a vertical sectional view showing an example inner structure of a gearbox of the steering apparatus of FIG. 1.
Figure 3:
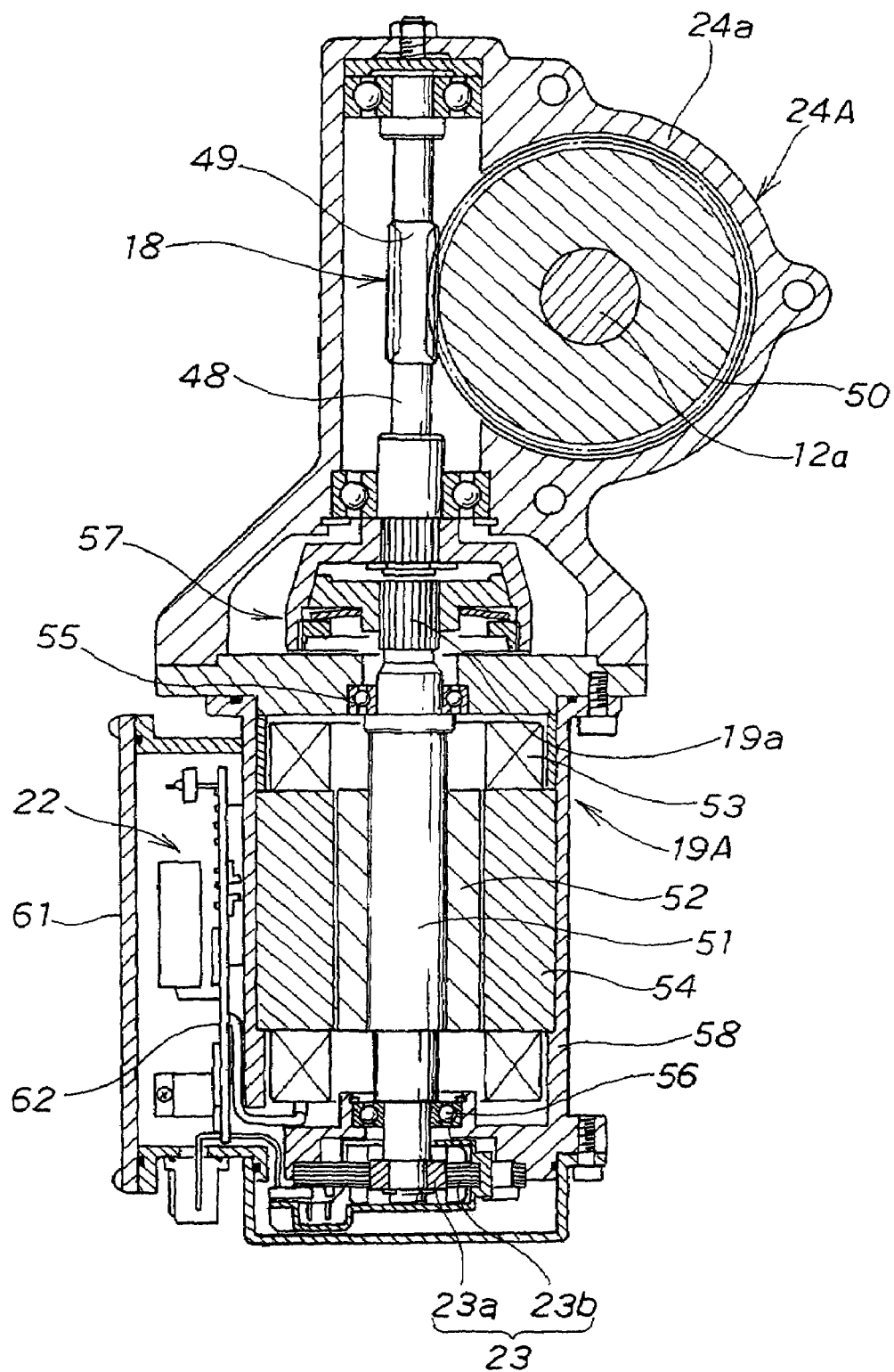
FIG. 3 is a sectional view taken along line A—A of FIG. 2.
Figure 4:
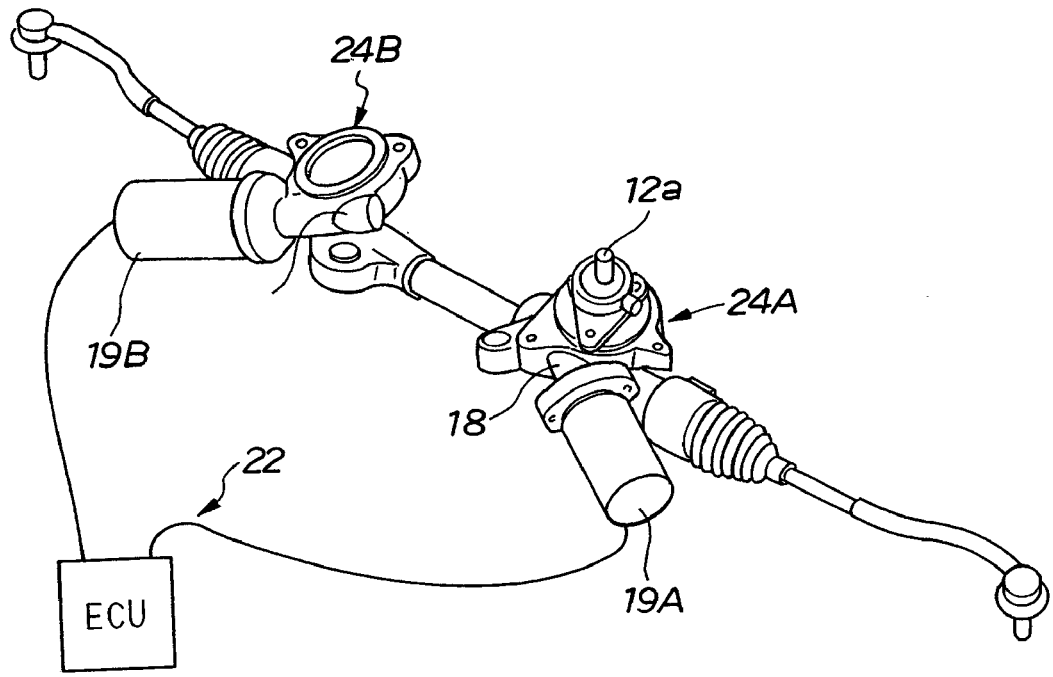
FIG. 4 is a view showing external layout on a rack shaft having two motors and gearboxes mounted thereon.
Figure 5:
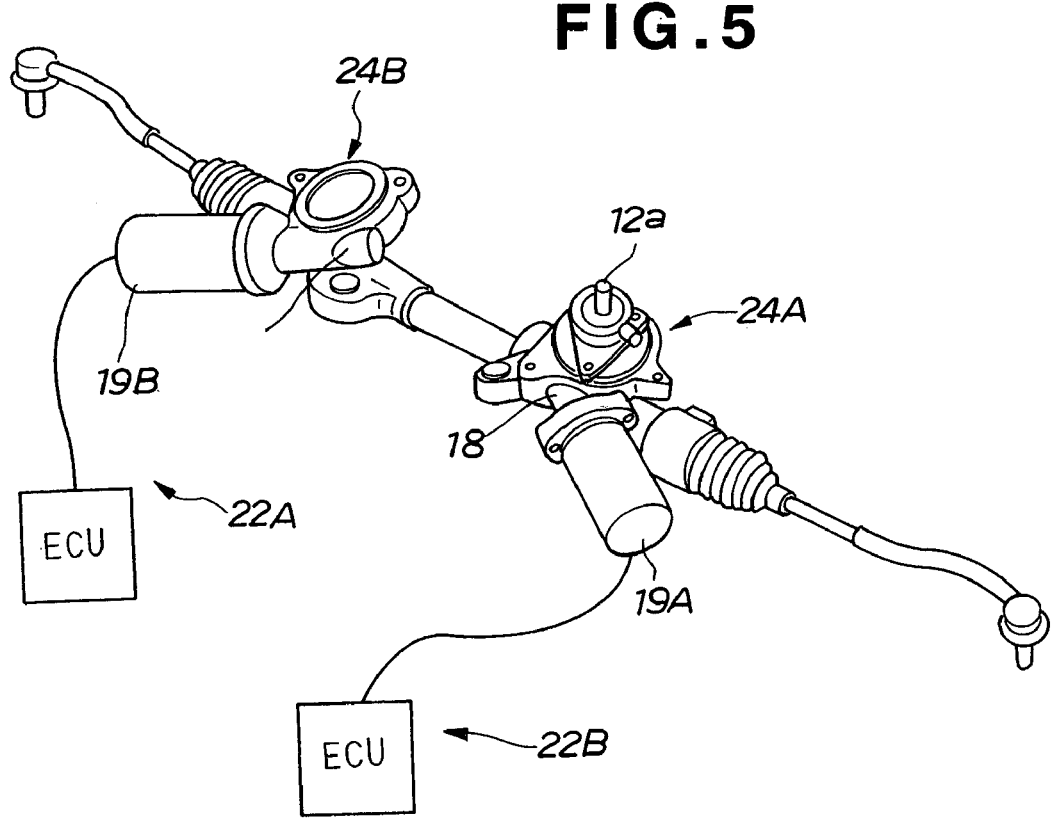
FIG. 5 is a view showing another example of external layout on the rack shaft having two motors and gearboxes mounted thereon.

First, with reference to FIGS. 1 to 5, a description will be given about a general setup of an electric power steering apparatus as an example of a steering apparatus the present invention. FIG. 1 is a view conceptually showing a fundamental structure of a dual-motor-type electric power steering apparatus, where only one of the steering assisting motors is shown. FIGS. 2 and 3 are sectional views showing an example inner structure of a gearbox, and FIGS. 4 and 5 are views showing external layout on a rack shaft having the two motors and gearbox mounted thereon.

The electric power steering apparatus 10 of the present invention is used in a motor vehicle, such as a passenger car. The electric power steering apparatus 10 is constructed to impart steering assist torque to a steering shaft 12 etc. connected to a steering wheel 11. The steering shaft 12 has an upper end connected to the steering wheel 11 and a lower end connected to a pinion gear (or pinion) 13. Hereinafter, a lower end portion of the steering shaft 12, where the pinion gear 13 is mounted, will be referred to as a "pinion shaft" 12a. In fact, the steering shaft 12 and the pinion shaft 12a located under the steering shaft 12 are interconnected via a universal joint (not shown). The pinion gear 13 meshes with a rack gear 14a formed on a rack shaft 14. The pinion gear 13 and rack gear 14a together constitute a rack and pinion mechanism 15.

The above-mentioned rack and pinion mechanism 15 formed between the pinion shaft 12 and the rack shaft 14 is accommodated together in a first gearbox 24A. Outer appearance of the gearbox 24A is illustrated in FIG. 4.

Tie rods 16 are connected to opposite ends of the rack shaft 14, and a front road wheel 17, functioning as a steerable road vehicle of the vehicle, is connected to the outer end of each of the tie rods 16.

Steering assisting motor 19A, which is, for example, a brushless motor, is connected via a power transmission mechanism 18 to the pinion shaft 12a. The power transmission mechanism 18 incorporated within the gearbox 24A comprises a worm gear mounted on an output shaft (worm shaft) 19A-1 of the motor 19, and a worm wheel fixed to the pinion shaft 12a. Detailed structure of the power transmission mechanism 18 will be described later.

As also shown in FIG. 1, a steering torque detection section 20, which is attached to the steering shaft 12 and incorporated within the gearbox 24A, detects a steering torque applied to the steering shaft 12 by the vehicle driver operating the steering wheel 12. Vehicle velocity detection section 21 detects a traveling velocity of the vehicle. Reference numeral 22 is a controller device (ECU) that is implemented by a computer system that uses a microcomputer etc. The controller device 22 receives a steering torque signal T from the steering torque detection section 20, a vehicle velocity signal V from the vehicle velocity detection section 21, etc., on the basis of which it generates a driving control signal SG1 for controlling the rotation of the steering assisting motor 19A etc. Rotational angle detection section 23, attached to the steering assisting motor 19A, detects a rotational angle (electrical angle) of the motor 19A and generates a signal SG2 indicative of the detected rotational angle, and the rotational angle signal SG2 is fed to the controller device 22.

In the instant embodiment of the electric power steering apparatus, there is provided another motor 19B (FIGS. 4 and 5) having the same construction, function and performance as the motor 19A, and both of the motors 19A and 19B are controlled by the controller device 22.

The following paragraphs describe respective internal structures of the gearbox 24A, power transmission mechanism 18, etc. with reference to FIGS. 2 and 3. FIG. 2 is a partially-sectional side view of the motor 19A as viewed in a left-to-right direction of FIG. 1, which shows parts along the axis of the pinion shaft 12a. FIG. 3 is a sectional view taken along the A—A line of FIG. 2.

In FIG. 2, the pinion shaft 12a is rotatably supported via two bearing sections 41 and 42 in a housing 24a forming the above-mentioned gearbox 24A. The rack and pinion mechanism 15 and power transmission mechanism (speed reducer) 18 are accommodated in the housing 24a, and the steering torque detection section 20 is attached to an upper portion of the housing 24a. The housing 24a has an upper opening closed with a lid 43 secured to the housing 24a via a bolt 44. The pinion gear 13 is mounted on a lower end portion of the pinion shaft 12a between the bearing sections 41 and 42. The rack shaft 14 is guided by a rack guide 45 and normally pressed against the pinion gear 13 by a pressing member 47 biased by a compression spring 46.

The power transmission mechanism 18 includes a worm gear 49 mounted on a transmission shaft (worm shaft) 48 coupled to the output shaft 19A-1 of the motor 19, and a worm wheel 50 fixed to the pinion shaft 12a. The steering torque detection section 20 includes a steering torque sensor 20a positioned around the pinion shaft 12a, and an electronic circuit section 20b for electrically processing a steering torque detection signal output from the steering torque sensor 20a. The steering torque sensor 20a is attached, for example, to the lid 43.

FIG. 3 shows detailed inner structures of the motor 19A and controller device 22.

The motor 19A includes a rotor 52 in the form of a permanent magnet fixedly mounted on a rotation shaft 51, and a stator 54 positioned around the rotor 52 and having stator windings 53 wound thereon. The rotation shaft 51 is rotatably supported via two bearing sections 55 and 56. One end portion of the rotation shaft 51 functions as an output shaft 19a (corresponding to the output shaft 19A-1 of FIG. 1) of the motor 19A. The output shaft 19a of the motor 19A is coupled to the transmission shaft 48 via a torque limiter 57 so that rotational force of the motor 19A can be transmitted to the transmission shaft 48 via the torque limiter 57. The worm gear 49 is fixed on the transmission shaft 48 as noted above, and the worm wheel 50 meshes with the worm gear 49. The above-mentioned rotational angle detection section (rotational position detection section) 23 for detecting a rotational angle (rotational position) of the rotor 52 of the motor 19A is provided at a rear end portion of the rotation shaft 51. The rotational angle detection section 23 includes a rotating element 23a fixed to the rotation shaft 51, and a detecting element 23b for detecting a rotational angle of the rotating element 23a through magnetic action. For example, the rotational angle detection section 23 may employ a resolver. Motor current, which is in the form of a three-phase alternating current, is supplied to the stator windings 53 of the stator 54. The above-described components of the motor 19A are positioned within a motor case 58.

The controller device 22, which is in the form of an ECU, includes electronic circuitry having various circuit components mounted on a circuit board 62 within a control box 61 attached to the outside of the motor case 58, a one-chip microcomputer attached to the outside of the control box 61, and circuitry peripheral to the microcomputer. The various circuit components include a pre-drive circuit, FET bridge circuit, inverter circuit, etc. Motor current (motor driving control signal SG1) is supplied from the controller device 22 to the stator windings 53 of the motor 19A, and a rotational angle signal SG2 generated by the rotational angle detection section 23 is supplied to the controller device 22.

With the above-described arrangements, the motor 19A can generate rotational force (torque) to assist steering torque and supply the thus-generated rotational force to the pinion shaft 12a, i.e. steering shaft 12, by way of the power transmission mechanism 18.

As illustratively shown in FIGS. 4 and 5, a second gearbox 24B, in addition to the first gear box 24A, is provided on the rack shaft 14. Like the first gear box 24A, the second gearbox 24B accommodates therein a rack gear formed on the rack shaft 14, a pinion gear meshing with the rack gear, and the pinion shaft having the pinion gear rotatably mounted thereon. The second motor 19B is attached to the second gearbox 24B via a second power transmission mechanism 18 similar in construction and function to the above-described first power transmission mechanism 18. The second motor 19B is exactly identical in construction, function and performance to the first motor 19A. Output shaft of the motor 19B has a transmission shaft (worm shaft) having a worm gear mounted thereon. Worm wheel meshing with the transmission shaft is fixedly mounted on the pinion shaft. The second gearbox 24B is fundamentally similar in construction to the first gearbox 24A. As the motor 19B is driven, the driving force is transmitted from the motor 19B to the rack shaft 14 via the output shaft, worm gear, worm wheel, pinion shaft, pinion gear and rack gear.

As set forth above, the instant embodiment of the electric power steering apparatus 10 includes two steering assisting motors 19A and 19B of the same performance to assist manual steering effort of the driver.

Embodiment of the electric power steering apparatus 10 shown in FIG. 4 is constructed by adding, to the conventional steering-related components, the steering torque detection section 20, vehicle velocity detection section 21, controller device 22 having a single ECU, first and second gearboxes 24A and 24B, two motors 19A and 19B and two power transmission mechanisms 18. Embodiment of the electric power steering apparatus 10 shown in FIG. 5 is, on the other hand, constructed by adding, to the conventional steering-related components, the steering torque detection section 20, vehicle velocity detection section 21, controller devices 22A and 22B having respective ECUs in corresponding relation to the motors 19A and 19B, first and second gearboxes 24A and 24B, and two power transmission mechanisms 18.

As the driver operates the steering wheel to change the traveling direction of the vehicle, rotational force based on steering torque applied to the steering shaft 12 via the driver's operation is converted, via the pinion shaft 12a and rack and pinion mechanism 15, into linear axial movement of the rack shaft 14, which changes the direction of the front road wheels 17 via the tie rods 16. During that time, the steering torque detection section 20 attached to the pinion shaft 12a detects the steering torque produced through the driver's steering operation of the steering wheel, converts the detected steering torque into an electrical steering torque signal T, and outputs the steering torque signal T to the controller device 22 or controller devices 22A and 22B. The vehicle velocity detection section 21 detects a current traveling velocity of the vehicle to generate a vehicle velocity signal V and outputs the velocity signal V to the controller device 22 or controller devices 22A and 22B. On the basis of the steering torque signal T and vehicle velocity signal V, the controller device 22 or controller devices 22A and 22B generate a motor current for driving the two motors 19A and 19B. The motors 19A and 19B, driven by the motor current, generate and applies steering assisting torque to the rack shaft 14 via the corresponding power transmission mechanisms 18*n* and gearboxes 24A and 24B. By driving the two motors 19A and 19B in the above-described manner, the instant embodiment can appropriately reduce the manual steering force to be applied by the driver to the steering wheel 11.

Figure 6:
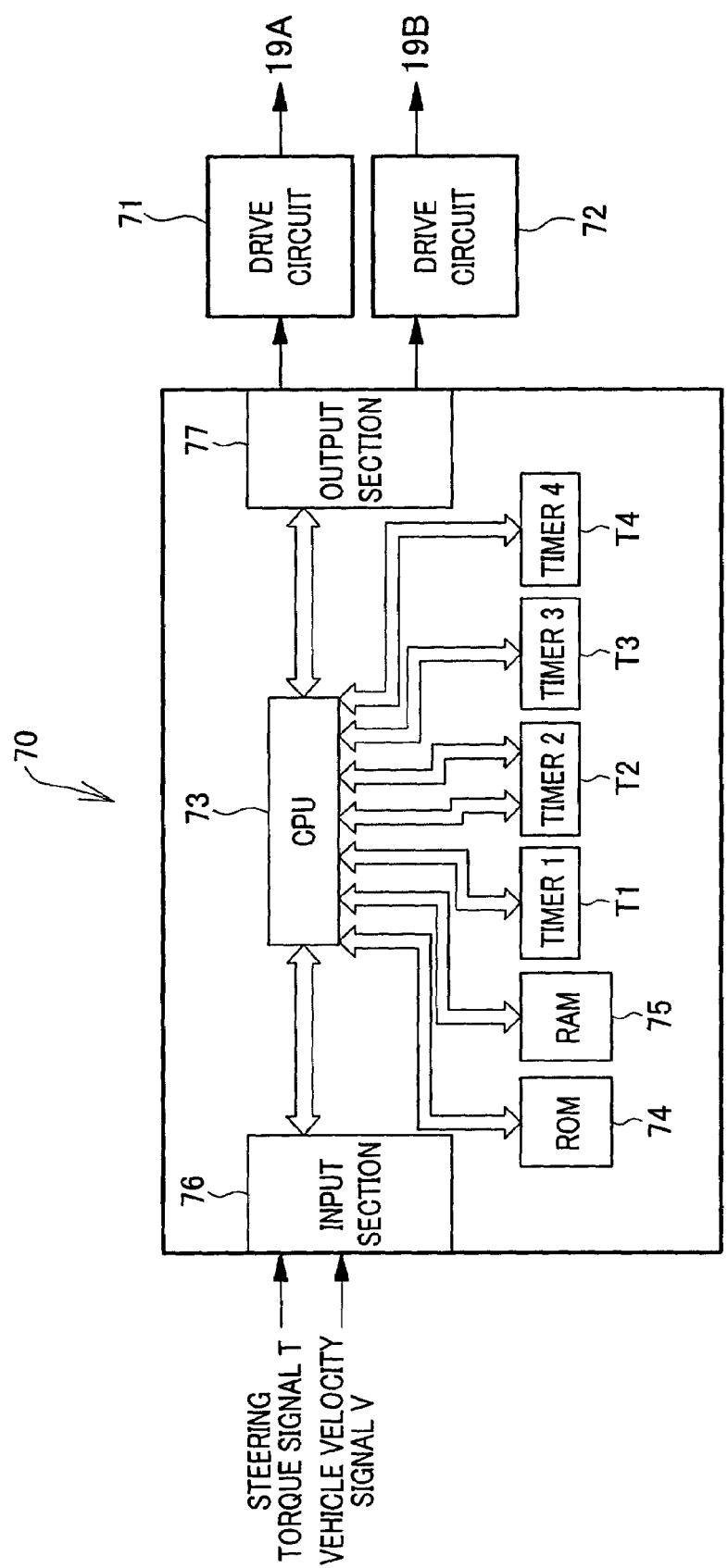
FIG. 6 is a block diagram showing a set up of a microcomputer employed in the steering apparatus.
Figure 7:
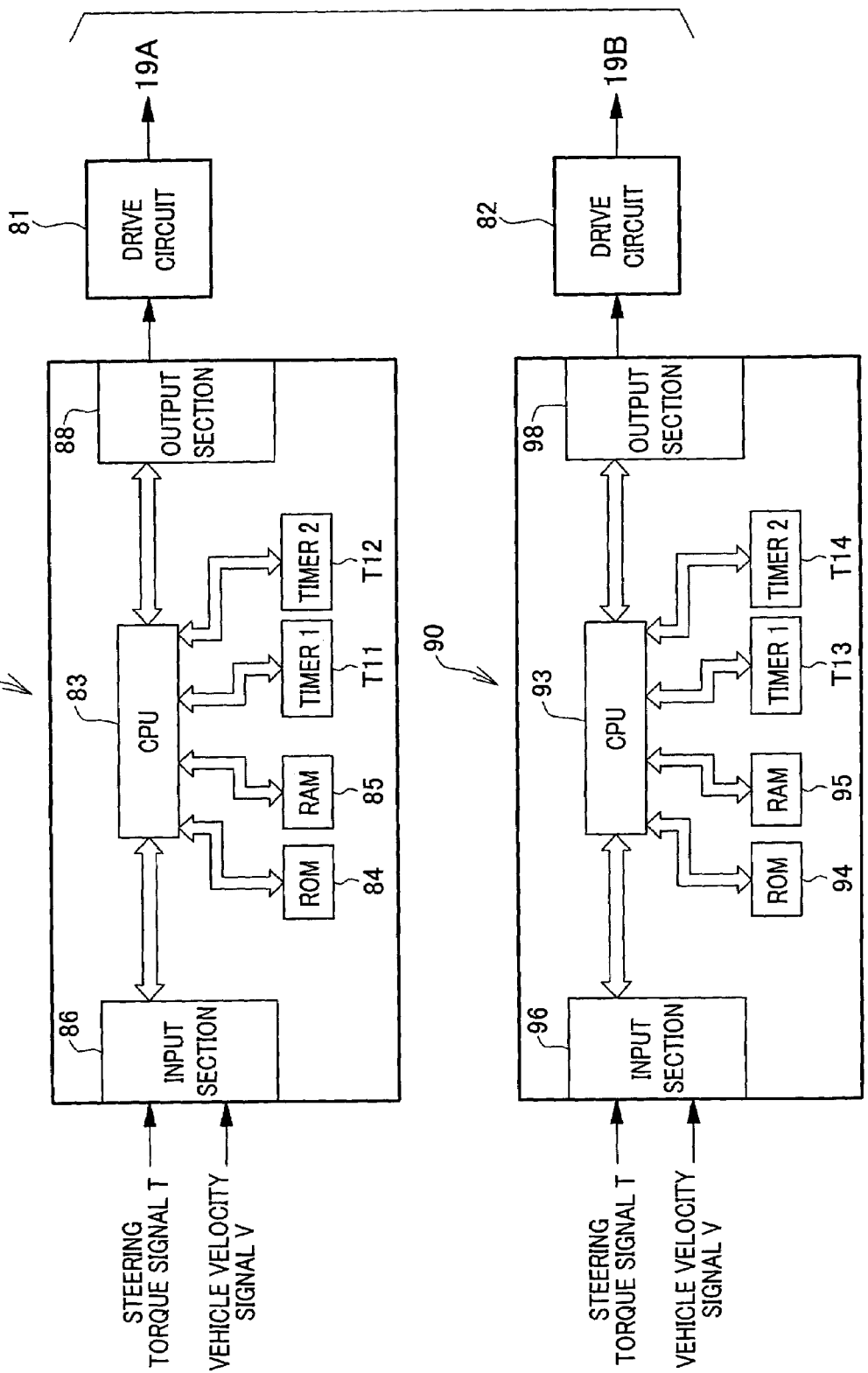
FIG. 7 is a block diagram showing setups of two microcomputers employed in the steering apparatus.

The following paragraphs describe characteristic arrangements of the first embodiment, with reference to FIGS. 4 and 5 and FIGS. 6 and 7. FIG. 6 shows the microcomputer 70 of the controller device in the case where there are provided a single ECU and two motor drive circuits, and FIG. 7 shows the microcomputers 80 and 90 in the case where there are provided two ECUs and two motor drive circuits.

As illustrated in FIGS. 4 and 5, the gearboxes 24A and 24B are provided on two axially-spaced-apart portions of the rack shaft 14. The first gearbox 24A connects to the pinion shaft 12*a* of the steering shaft 12, and the second gearbox 24B has the second motor 19B attached thereto in the dual-motor-type electric power steering apparatus 10. Specifically, the motors 19A and 19B are attached to the first and second gearboxes 24A and 24B, respectively, via the power transmission mechanisms 18. Steering assisting torque, produced by rotation of the two motors 19A and 19B, is applied to the rack shaft 14 having the steerable front road wheels 17 connected to the opposite ends thereof. The motor 19A is driven by a motor drive circuit 71 of FIG. 6, while the motor 19B is driven by a motor drive circuit 72 of FIG. 6.

In the example of FIG. 6, the microcomputer 70 comprises a CPU 73, ROM 74, RAM 75, input section 76, output section 77, and timers T1, T2, T3 and T4. The ROM 74 is a memory having control programs prestored therein, and the RAM 75 is a memory for temporary use during execution of any of the programs. In the ROM 74, there is also prestored a program for forming a sinusoidal wave. The input section 76 inputs the steering torque signal T and vehicle velocity signal V to the microcomputer 70, and the output section 77 outputs PWM control pulses for controlling driving of the motors 19A and 19B via the motor drive circuits 71 and 72. The timer T1 is a time measuring counter for setting a cyclic period of a reference triangular wave to be used for forming the PWM control pulses that are to be given to the motor drive circuit 71, and the timer T3 is a time measuring counter for setting a cyclic period of a reference triangular wave to be used for forming the PWM control pulses that are to be given to the motor drive circuit 72.

It is to be appreciated that settings of the timers T1 and T3 are chosen to differ from each other so as to provide different cyclic periods of the reference triangular waves; for example, the timer T1 is set to provide a 18 kHz frequency of the reference triangular wave while the timer T3 is set to provide a 20 kHz frequency of the reference triangular wave. Namely, it is necessary that the timers T1 and T3 be set to provide different cyclic periods of the reference triangular waves so as to prevent the respective switching elements of the drive circuits 71 and 72 from being switched on and off at the same timing.

Figure 8:
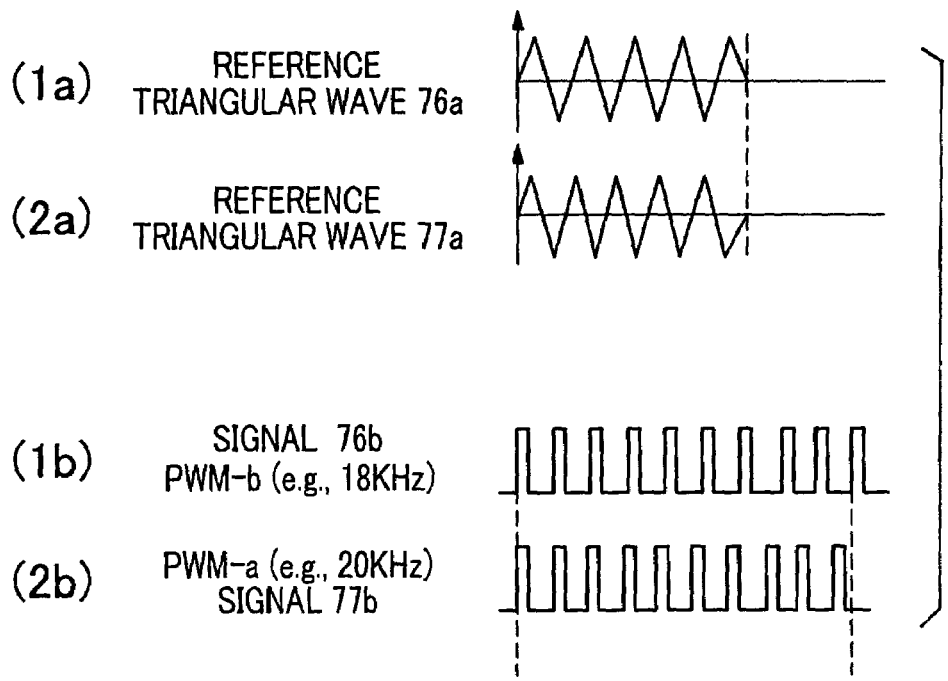
FIG. 8 is a diagram showing examples of reference triangular waves and PWM signals.

The timers T1 and T3, preset in the above-described manner, permit generation of reference triangular waves 76*a* and 77*a* of cyclic periods determined by the preset data, as illustratively shown in sections (1*a*) and (2*a*) of FIG. 8. In sections (1*a*) and (2*a*) of FIG. 8, the horizontal axis represents time, while the vertical axis represents voltage. The reference triangular waves 76*a* and 77*a* are compared, via comparators, to target sinusoidal wave data that are voltage level instructions, to thereby generate switching signals. The switching elements of the two motor drive circuits 71 and 72 are driven by the thus-generated switching signals. At that time, the motor drive circuit 71 would produce unwanted switching noise and the associated motor 19A would produce unwanted magnetostrictive sound, and so would the motor drive circuit 72 and associated motor 19B. Because of the above-noted relationship between the settings of the timers T1 and T3, i.e. between the frequencies of the reference triangular waves, the reference triangular waves 76*a* and 76*b* differ in waveform from each other, so that the switching timing of the switching elements differs between the motor drive circuits 71 and 72 and thus the switching noise peak levels can be reduced by virtue of level distribution attained by the differentiated switching timing. As a consequence, it is possible to effectively lower the unwanted switching noise and magnetostrictive sound.

In the example of FIG. 7, the motor 19A is driven by a driver circuit 81 while the motor 19B is driven by a driver circuit 82, and microcomputers 80 and 90 are connected to the motor drive circuits 81 and 82, respectively. The microcomputer 80, which is connected to the motor drive circuit 81 for driving the motor 19A, comprises a CPU 83, ROM 84, RAM 85, input section 86, output section 88, and timers T11 and T12. The ROM 84 is a memory having control programs prestored therein, and the RAM 85 is a memory for temporary use during execution of any of the programs. In the ROM 84, there is also prestored a program for forming a sinusoidal wave. The input section 86 inputs the steering torque signal T and vehicle velocity signal V to the microcomputer 80, and the output section 88 outputs PWM control pulses for controlling driving of the motor 19A via the motor drive circuit 81. The timer T11 is a time measuring counter for setting a cyclic period of a reference triangular wave to be used for forming the PWM control pulses that are to be given to the motor drive circuit 71.

The microcomputer 90, which is connected to the motor drive circuit 82 for driving the motor 19B, comprises a CPU 93, ROM 94, RAM 95, input section 96, output section 98, and timers T13 and T14. The ROM 94 is a memory having control programs prestored therein, and the RAM 95 is a memory for temporary use during execution of any of the programs. In the ROM 94, there is also prestored a program for forming a sinusoidal wave. The input section 96 inputs the steering torque signal T and vehicle velocity signal V to the microcomputer 90, and the output section 98 outputs PWM control pulses for controlling driving of the motor 19B via the motor drive circuit 82. The timer T13 is a time measuring counter for setting a cyclic period of a reference triangular wave to be used for forming the PWM control pulses that are to be given to the motor drive circuit 82.

Settings of the timers T11 and T13 are chosen to differ from each other so as to provide different cyclic periods of the reference triangular waves to be used for formation of the PWM control pulses; for example, the timer T11 is set to provide a 18 kHz frequency of the reference triangular wave while the timer T13 is set to provide a 20 kHz frequency of the reference triangular wave. Namely, it is necessary that the timers T1 and T3 be set to provide different cyclic periods of the reference triangular waves so as to prevent the respective switching elements of the drive circuits 81 and 82 and from being switched on and off at the same timing.

The timers T11 and T13, preset in the above-described manner, permit generation of reference triangular waves of cyclic periods determined by the preset data, as denoted at 76a and 77a in sections (1a) and (2a) of FIG. 8. The reference triangular waves 76a and 77a are compared, via comparators, to target sinusoidal wave data that are voltage level instructions, to thereby generate switching signals. The switching elements of the two motor drive circuits 81 and 82 are driven by the thus-generated switching signals. At that time, the motor drive circuit 81 would produce switching noise and the associated motor 19A would produce magnetostrictive sound, and so would the motor drive circuit 82 and associated motor 19B. Because of the above-noted relationship between the settings of the timers T11 and T13, the reference triangular waves 76a and 76b differ in waveform from each other, so that switching timing differ between the motor drive circuits 81 and 82 and thus the switching noise peak levels can be reduced by virtue of level distribution attained by the differentiated switching timing. As a consequence, it is possible to lower the switching noise and magnetostrictive sound.

The following paragraphs describe the first embodiment of the present invention in relation to the case where the steering assisting motors 19A and 19B are of the brushed type. In this case, the controller device 22 is similar in construction to that employed for the brushless motors, and thus the controller device 22 for the brushed motors 19A and 19B are also described with reference to FIGS. 6 and 7 having been explained above for the brushless motors.

Namely, as illustrated in FIG. 6, the microcomputer 70 comprises a CPU 73, ROM 74, RAM 75, input section 76, output section 77, and timers T1, T2, T3 and T4. The ROM 74 is a memory having control programs prestored therein, and the RAM 75 is a memory for temporary use during execution of any of the programs. The input section 76 inputs the steering torque signal T and vehicle velocity signal V to the microcomputer 70, and the output section 77 outputs PWM control pulses for controlling driving of the brushed motors 19A and 19B via the motor drive circuits 71 and 72. The timer T1 is a time measuring counter for setting a cyclic period of PWM control of the motor drive circuit 71, and the timer T2 is a time measuring counter for setting a pulse width for the PWM control of the motor drive circuit 71. The timer T3 is a time measuring counter for setting a cyclic period of PWM control of the motor drive circuit 72, and the timer T4 is a time measuring counter for setting a pulse width for the PWM control of the motor drive circuit 72.

It is to be appreciated that settings of the timers T1 and T3 are chosen to differ from each other so as to provide different cyclic periods of the PWM control pulse signals; for example, the timer T1 is set to provide a 18 kHz PWM frequency while the timer T3 is set to provide a 20 kHz PWM frequency. Namely, it is necessary that the timers T1 and T3 be set to provide different cyclic periods of PWM control signals so as to prevent the respective switching elements of the drive circuits from being switched on and off at the same timing.

The timers T1 and T3, preset in the above-described manner, permit generation of PWM signals 76b and 77b, as illustratively shown in sections (1b) and (2b) of FIG. 8. In sections (1b) and (2b) of FIG. 8, the horizontal axis represents the passage of time, while the vertical axis represents the voltage level. The switching elements of the two motor drive circuits 71 and 72 are driven with the PWM signals of pulse widths set by the timers T2 and T4. At that time, the motor drive circuit 71 would produce switching noise and the associated motor 19A would produce magnetostrictive sound, and so would the motor drive circuit 72 and associated motor 19B. Because of the above-noted relationship between the settings of the timers T1 and T3, i.e. between the frequencies of the PWM control, the reference triangular waves 76a and 76b differ in waveform from each other, so that switching timing differ between the motor drive circuits 71 and 72 and thus the switching noise peak levels can be reduced by virtue of level distribution attained by the differentiated switching timing. As a consequence, it is possible to lower the switching noise and magnetostrictive sound.

As illustrated in FIG. 7, the motor 19A is driven by the driver circuit 81 while the motor 19B is driven by the driver circuit 82, and microcomputers 80 and 90 are connected to the motor drive circuits 81 and 82, respectively. The microcomputer 80, which is connected to the motor drive circuit 81 for driving the motor 19A, comprises a CPU 83, ROM 84, RAM 85, input section 86, output section 88, and timers T11 and T12. The ROM 84 is a memory having control programs prestored therein, and the RAM 85 is a memory for temporary use during execution of any of the programs. The input section 86 inputs the steering torque signal T and vehicle velocity signal V to the microcomputer 80, and the output section 88 outputs PWM control pulses for controlling driving of the motor 19A via the motor drive circuit 81. The timer T11 is a time measuring counter for setting a cyclic period of PWM control of the motor drive circuit 81, and the timer T12 is a time measuring counter for setting a pulse width for the PWM control of the motor drive circuit 81.

The microcomputer 90, which is connected to the motor drive circuit 82 for driving the motor 19B, comprises a CPU 93, ROM 94, RAM 95, input section 96, output section 98, and timers T13 and T14. The ROM 94 is a memory having control programs prestored therein, and the RAM 95 is a memory for temporary use during execution of any of the programs. The input section 96 inputs the steering torque signal T and vehicle velocity signal V to the microcomputer 90, and the output section 98 outputs PWM control pulses for controlling of driving the motor 19B via the motor drive circuit 82. The timer T13 is a time measuring counter for setting a cyclic period of PWM control of the motor drive circuit 82, and the timer T14 is a time measuring counter for setting a pulse width for the PWM control of the motor drive circuit 82.

It is to be appreciated that settings of the timers T11 and T13 are chosen to differ from each other so as to provide different cyclic periods of the PWM control pulse signals; for example, the timer T11 is set to provide a 18 kHz PWM frequency while the timer T13 is set to provide a 20 kHz PWM frequency. Namely, it is necessary that the timers T11 and T13 be set to provide different cyclic periods of PWM control signals so as to prevent the respective switching elements of the drive circuits 81 and 82 from being switched on and off at the same timing.

The timers T11 and T13, preset in the above-described manner, permit generation of PWM signals, as illustratively shown at 76b and 77b in sections (1b) and (2b) of FIG. 8. The switching elements of the two motor drive circuits 81 and 82 are driven with the PWM signals of pulse widths set by the timers T12 and T14. At that time, the motor drive circuit 81 would produce switching noise and the associated motor 19A would produce magnetostrictive sound, and so would the motor drive circuit 82 and associated motor 19B.

Because of the above-noted relationship between the settings of the timers T11 and T13, i.e. between the frequencies of the PWM control, the signals 76a and 76b differ in waveform from each other, so that switching timing differ between the motor drive circuits 81 and 82 and thus the switching noise peak levels can be reduced by virtue of level distribution attained by the differentiated switching timing. As a consequence, it is possible to lower the switching noise and magnetostrictive sound.

Next, a description will be given about characteristic arrangements of a second embodiment of the present invention, with reference to FIGS. 4 and 5 and FIGS. 6 and 7. First, the arrangements of the second embodiment will be described in relation to the case where the steering assisting motors are of the brushless type. FIG. 6 shows a single microcomputer of the controller device in the case where there are provided a single ECU and two motor drive circuits, and FIG. 7 shows two microcomputers in the case where there are provided two ECUs and two motor drive circuits. In the second embodiment, the microcomputer of the controller device is similar in construction to that employed in the above-described first embodiment.

In FIG. 6, the timers T1 and T3 for setting the cyclic periods of the PWM control pulses are set to the same settings, with either one of the timers T1 or T3 being imparted with a phase offset. For example, both of the timers T1 and T3 are set to provide a 20 kHz frequency of the reference triangular wave, with the timer T3 being imparted with a phase offset. In other words, the timers T1 and T3 are set to provide the same frequency, but different phases, of the reference triangular waves, so as to prevent the respective switching elements of the drive circuits from being switched on and off at the same timing.

Figure 9:
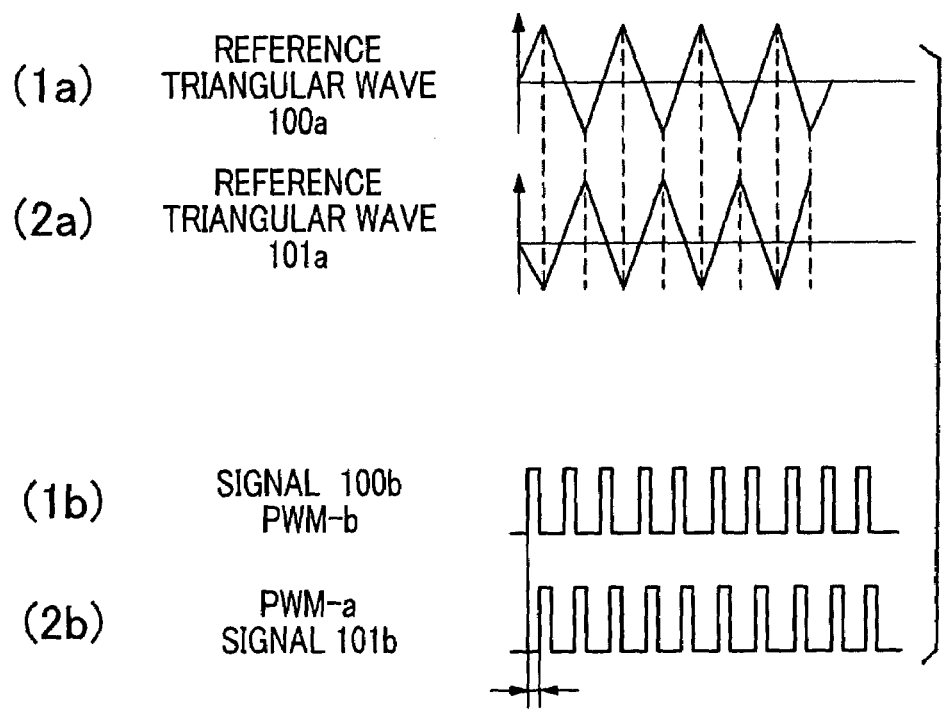
FIG. 9 is a diagram showing other examples of the reference triangular waves and PWM signals.

The timers T1 and T3, preset in the above-described manner, permit generation of reference triangular waves 100a and 101a, as illustratively shown in sections (1a) and (2a) of FIG. 9. In sections (1a) and (2a) of FIG. 9, the horizontal axis represents the passage of time, while the vertical axis represents the voltage level. The reference triangular waves 100a and 101a are compared, via comparators, to target sinusoidal wave data that are voltage level instructions, to thereby generate switching signals. The switching elements of the two motor drive circuits 71 and 72 are driven by the thus-generated switching signals. At that time, the motor drive circuit 71 would produce switching noise and the associated motor 19A would produce magnetostrictive sound, and so would the motor drive circuit 72 and associated motor 19B. Because of the above-noted relationship between the settings of the timers T1 and T3, i.e. between the frequencies of the reference triangular waves, the reference triangular waves 100a and 101a differ in waveform from each other, so that the switching timing differ between the motor drive circuits 71 and 72 and thus the switching noise peak levels can be reduced by virtue of level distribution attained by the differentiated switching timing. As a consequence, it is possible to lower the switching noise and magnetostrictive sound.

In FIG. 7, the microcomputers 80 and 90 are caused to operate in a synchronized fashion, and the timers T11 and T3 for setting the cyclic periods of reference triangular waves for formation of PWM control pulses are set to the same settings, with either one of the timers T11 or T13 being imparted with a phase offset. For example, both of the timers T11 and T13 are set to provide a 20 kHz frequency of the reference triangular waves, with the timer T13 being imparted with a phase offset. In other words, the timers T11 and T13 are set to provide the same frequency, but different phases, of the reference triangular waves, so as to prevent the respective switching elements of the drive circuits from being switched on and off at the same timing.

The timers T11 and T13, preset in the above-described manner, permit generation of reference triangular waves as denoted at 100a and 101a in sections (1a) and (2a) of FIG. 9. The reference triangular waves 100a and 101a are compared, via comparators, to target sinusoidal wave data that are voltage level instructions, to thereby generate switching signals. The switching elements of the two motor drive circuits 81 and 82 are driven by the thus-generated switching signals. At that time, the motor drive circuit 81 would produce switching noise and the associated motor 19A would produce magnetostrictive sound, and so would the motor drive circuit 82 and associated motor 19B. Because of the above-noted relationship between the settings of the timers T11 and T13, i.e. between the frequencies of the reference triangular waves, the reference triangular waves 100a and 101a differ in waveform from each other, so that the switching timing differ between the motor drive circuits 81 and 82 and thus the switching noise peak levels can be reduced by virtue of level distribution attained by the differentiated switching timing. As a consequence, it is possible to lower the switching noise and magnetostrictive sound.

The following paragraphs describe the second embodiment of the invention in relation to the case where the steering assisting motors 19A and 19B are of the brushed type. In this case, the controller device 22 is similar in construction to that employed for the brushless motors, and thus the controller device 22 for the brushed motors 19A and 19B are also described with reference to FIGS. 6 and 7 having been explained above in relation to the brushless motors.

Here, the timers T1 and T3 for setting the cyclic periods of the PWM control pulses are set to the same settings, with either one of the timers T1 or T3 being imparted with a phase offset. For example, both of the timers T1 and T3 are set to provide a 20 kHz frequency of the PWM control, with the timer T3 being imparted with a phase offset. In other words, the timers T1 and T3 are set to provide the same frequency, but different phases, of the PWM control signals, so as to prevent the respective switching elements of the drive circuits from being switched on and off at the same timing.

The timers T1 and T3, preset in the above-described manner, permit generation of signals 100b and 101b, as illustratively shown in sections (1b) and (2b) of FIG. 9. In sections (1b) and (2b) of FIG. 9, the horizontal axis represents the passage of time, while the vertical axis represents the voltage level.

The switching elements of the two motor drive circuits 71 and 72 are driven with the PWM signals of pulse widths set by the timers T2 and T4. At that time, the motor drive circuit 71 would produce switching noise and the associated motor 19A would produce magnetostrictive sound, and so would the motor drive circuit 72 and associated motor 19B. Because of the above-noted relationship between the settings of the timers T1 and T1, i.e. between the frequencies of the PWM control, the signals 101a and 101b differ in waveform from each other, so that switching timing differ between the motor drive circuits 71 and 72 and thus the switching noise peak levels can be reduced by virtue of level distribution attained by the differentiated switching timing. As a consequence, it is possible to lower the switching noise and magnetostrictive sound.

In FIG. 7, the microcomputers 80 and 90 are caused to operate in a synchronized fashion, and the timers T11 and T3 for setting the cyclic periods of the PWM control pulses are set to the same settings, with either one of the timers T11 or T13 being imparted with a phase offset. For example, both of the timers T11 and T13 are set to provide a 20 kHz frequency of the PWM control, with the timer T13 being imparted with a phase offset. In other words, the timers T11 and T13 are set to provide the same frequency, but different phases, of the PWM control signals, so as to prevent the respective switching elements of the drive circuits from being switched on and off at the same timing.

The timers T11 and T13, preset in the above-described manner, permit generation of signals as denoted at 100b and 101b in sections (1b) and (2b) of FIG. 9. The switching elements of the two motor drive circuits 81 and 82 are driven with the PWM signals of pulse widths set by the timers T12 and T14. At that time, the motor drive circuit 81 would produce switching noise and the associated motor 19A would produce magnetostrictive sound, and so would the motor drive circuit 82 and associated motor 19B. Because of the above-noted relationship between the settings of the timers T11 and T13, i.e. between the frequencies of the PWM control, the reference triangular waves 100b and 101b differ in waveform from each other, so that switching timing differ between the motor drive circuits 81 and 82 and thus the switching noise peak levels can be reduced by virtue of level distribution attained by the differentiated switching timing. As a consequence, it is possible to lower the switching noise and magnetostrictive sound.

Next, a third embodiment of the present invention will be described with reference to FIG. 10, in relation the a detailed construction of the controller device (ECU) 22 in the steering apparatus having redundant control arrangements.

As shown in the figure, detection signal output terminals of the steering torque detection section 20 comprise pairs of opposite end terminals 20a and 20b, and a pair of central terminals 20c. Two electrical connector sections 141a and 141b are provided between the opposite end terminals 20a, 20b and central terminals 20c and the controller device 22. Each of the connector sections 141a and 141b includes a wiring harness and coil connector. The controller device 22 includes torque signal input sections 142a and 142b provided in corresponding relation to the connector sections 141a and 141b.

Within the controller device 22, there are provided three CPUs (CPU 1-CPU 3) 143a, 143b and 143c. Two timers T100a, T101a, T100b, 1001b or T100c, 101c are provided for each of the three CPUs 143a, 143b and 143c. Each of the two torque signal input sections 142a and 142b in the controller device 22 has three output terminals, and the output terminals provided at corresponding positions of the input sections 142a and 142b output the same signals SG11, SG12 and SG13. Each of the three CPUs 143a–143c is redundantly supplied with the same signals SG11, SG12 and SG13 from the two input sections 142a and 142b via two input signal paths. Further, the three CPUs 143a, 143b and 143c are paired in given combinations so that a majority decision can be made by the CPUs 143a–143c. Thus, in case a failure occurs in any of the electrical connector sections 141a, 141b etc., a determination can be made as to the failure by the majority decision. Furthermore, the aforementioned various functions are implemented by the CPUs 143a–143c in a software manner. Preferably, two target motor current setting sections are provided and the steering torque signal T is input to the two target motor current setting sections via the two input signal paths, so that each of the target motor current setting sections can set a target motor current.

In rear stages of the controller devices 22, there are provided pairs of motor drive circuits 144a and 144b, voltage raising circuits 145a and 145b, F/S relays 146a and 146b and power relays 147a and 147b. In each of the pairs, the two components 144a and 144b, 145a and 145b, 146a and 146b, and 147a and 147b are constructed and operate in the same manner. The motor drive circuit 144a is provided in corresponding relation to the CPU 143a with an inhibition circuit 148a connecting between the motor drive circuit 144a and the CPU 143a, and the motor drive circuit 144b is provided in corresponding relation to the CPU 143c with an inhibition circuit 148b connecting between the motor drive circuit 144b and the CPU 143c. Thus, within the controller device 22 and for control of driving of the motor 19, a first motor drive circuit section (first motor drive channel) is made up of the CPU 143a, inhibition circuit 148a and motor drive circuit 144a, and a second motor drive circuit section (second motor drive channel) is made up of the CPU 143c, inhibition circuit 148b and motor drive circuit 144b.

Signal output from the CPU 143b is sent to the inhibition circuit 148c, and an output signal from the inhibition circuit 148c is sent to the inhibition circuit 148a. Further, an output signal from the CPU 143a is sent to the inhibition circuit 148b.

The motor ("M") 19, which is a brushed motor, has two pairs of brushes 149a and 149b. Motor current $I_{M1}$ output from the motor drive circuit 144a of the first motor drive circuit section is supplied to the motor 19 via the brush 149a, and a motor current $I_{M2}$ output from the motor drive circuit 144b of the second motor drive circuit section is supplied to the motor 19 via the brush 149b. Namely, the brushed motor 19 too is provided with the two pairs of brushes in corresponding relation to the first and second motor drive circuit sections. Further, two electrical connection sections, such as motor harnesses, are provided to permit supply of the motor currents $I_{M1}$ and $I_{M2}$.

Battery 150 supplies electric power to the controller device 22 via two power feed paths 151a and 151b. The first power feed path 151a supplies electric power to the motor drive circuit 144a in any one of three power feed paths: via the power relay 147a and voltage raising circuit 145a (first power feed path); directly with no intervening component (second power feed path); and via the power relay 147a (third power feed path). Similarly, the second power feed path 151b supplies electric power to the motor drive circuit 144b in any one of three power feed paths: via the power relay 147b and voltage raising circuit 145b (first power feed path); directly with no intervening component (second power feed path); and via the power relay 147b (third power feed path).

The motor current $I_{M1}$ output from the motor drive circuit 144a is detected by a current sensor 152a and fed back to each of the CPUs 143a–143c. The motor current $I_{M2}$ output from the motor drive circuit 144b is detected by a current sensor 152b and fed back to each of the CPUs 143a–143c.

As set forth above, the controller device 22 in accordance with the third embodiment of the invention is characterized by the dual parallel sets of the electrical connection sections connecting from the steering torque detection section 20 to the controller device 22, motor drive circuit sections including the motor drive circuits 144a and 144b, power feed paths connecting from the battery 150 to the motor drive circuits 144a and 144b and brush pairs 149a and 149b of the motor 19. Thus, in case a failure occurs in any one of the sets of the controller device 22, the remaining set allows the electric power steering apparatus to continue to work. Such redundant arrangements can effectively avoid an undesired system failure of the electric power steering apparatus.

In the controller device 22, the motor drive control is normally performed by operation of either one of the two parallel motor drive circuits 144a or 144b. Once the one motor drive circuit 144a or 144b has failed, the other motor drive circuit 144b or 144a is activated to continue the motor drive control. Alternatively, both of the motor drive circuits 144a and 144b may be kept in operative condition concurrently to jointly perform the motor drive control so that, once one of the motor drive circuits 144a or 144b has failed, the motor drive control can be continued with the other motor drive circuit 144b or 144a. Note that the above-mentioned inhibition circuits 148a, 148b and 148c function to select one of the drive channels to be used for the motor drive control within the controller device 22.

Figure 10:
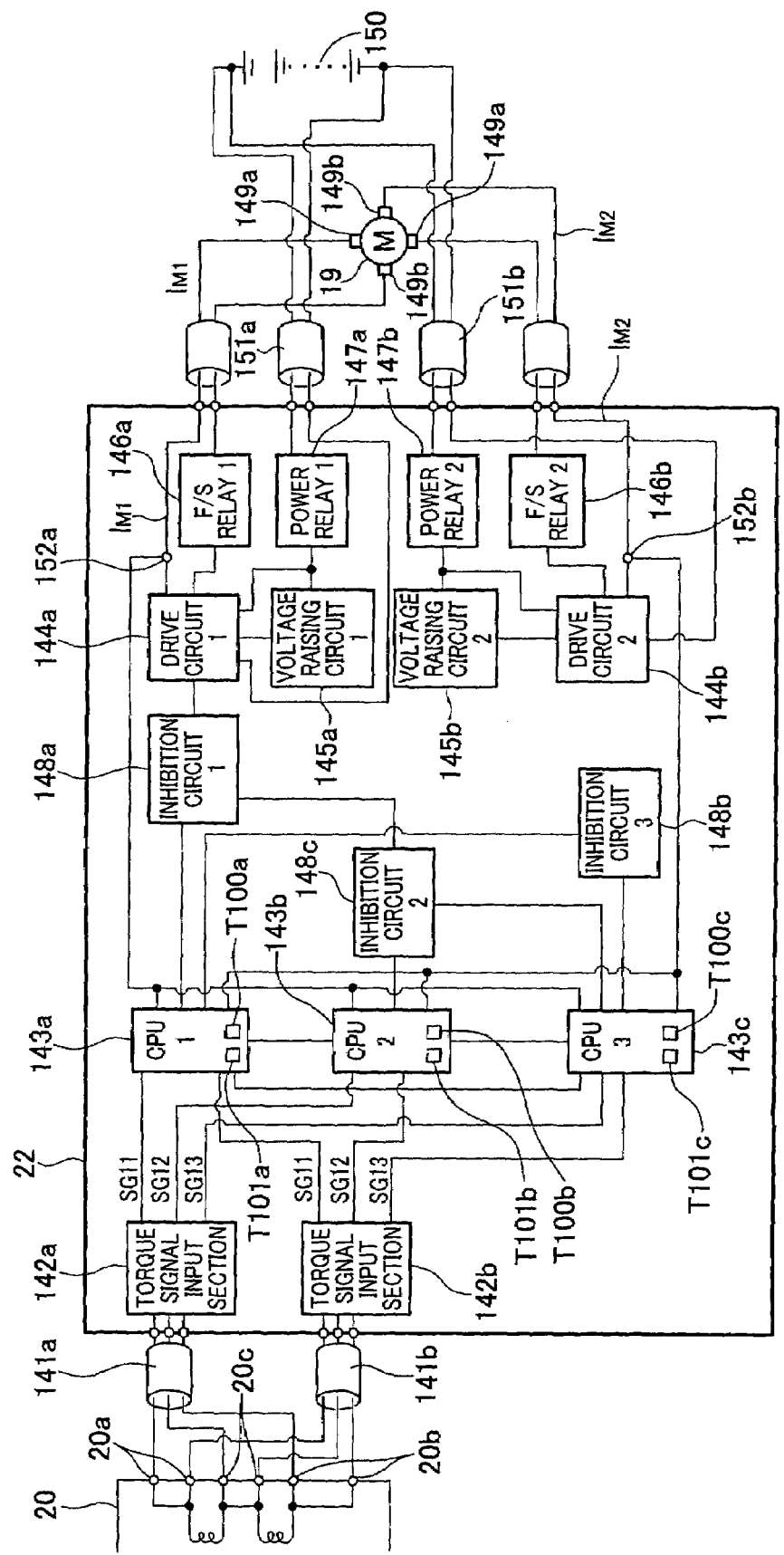
FIG. 10 is a block diagram showing a detailed setup of a controller device employed in the steering apparatus.

Further, in FIG. 10, timers T100a, T100b and T100c are time measuring counters for setting cyclic periods of PWM control of the drive circuits, and timers T101a, T101b and T101c are time measuring counters for setting pulse widths for the PWM control of the drive circuits.

It is to be appreciated that settings of the timers T100a, T100b and T100c are chosen to differ from one another so as to provide different cyclic periods of the PWM control pulse signals; for example, the timer T100a is set to provide a 18 kHz PVM frequency, the timer T100b is set to provide a 20 kHz PWM frequency, and the timer T100c is set to provide a 22 kHz PWM frequency. Namely, it is essential that the timers T100a, T100b and T100c be set to provide different frequencies of PWM control signals so as to prevent the PWM switching elements from being switched on and off at the same timing.

Figure 11:
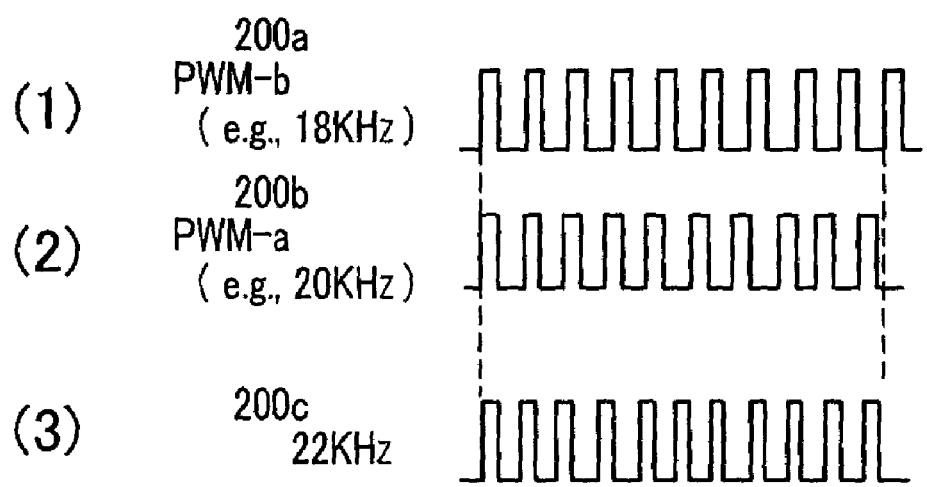
FIG. 11 is a diagram showing other examples of reference triangular waves and PWM signals.

The timers T100a, T100b and T100c, preset in the above-described manner, permit generation of PWM signals 200a, 200b and 200c, as illustratively shown in sections (1), (2) and (3) of FIG. 11. In sections (1), (2) and (3) of FIG. 11, the horizontal axis represents the passage of time, while the vertical axis represents the voltage level. The switching elements of the two drive circuits are driven with the PWM signals of pulse widths set by the timers T101a, T101b and T101c. At that time, the drive circuits 144a and 144b would produce switching noise and the motor 19 would produce magnetostrictive sound. Because of the above-noted relationship among the settings of the timers T100a, T100b and T100c, the PWM switching timing differ as represented by the waveforms of the signals 200a, 200b and 200c, so that the noise peak levels generated by the switching can be reduced by virtue of level distribution attained by the differentiated switching timing. As a consequence, it is possible to lower the switching noise and magnetostrictive sound.

In an alternative, the timers T100a, T100b and T100c for setting the cyclic periods of the PWM control pulses are set to the same settings, with the timers T100b and T100c being imparted with different phase offsets. For example, the timer T100a is set to provide a 20 kHz PWM frequency, the timer T100b is set to provide a 20 kHz PWM frequency, and a given phase offset is imparted to the timer T100b. Also, the timer T100c is set to provide a 20 kHz PWM frequency, and a phase offset different from the offset of the timer T100b is imparted to the timer T100c. In other words, the timers T100a, T100b and T100c are set to provide the same frequency, but different phases, of the PWM control signals, so as to prevent the PWM switching elements from being switched on and off at the same timing.

Figure 12:
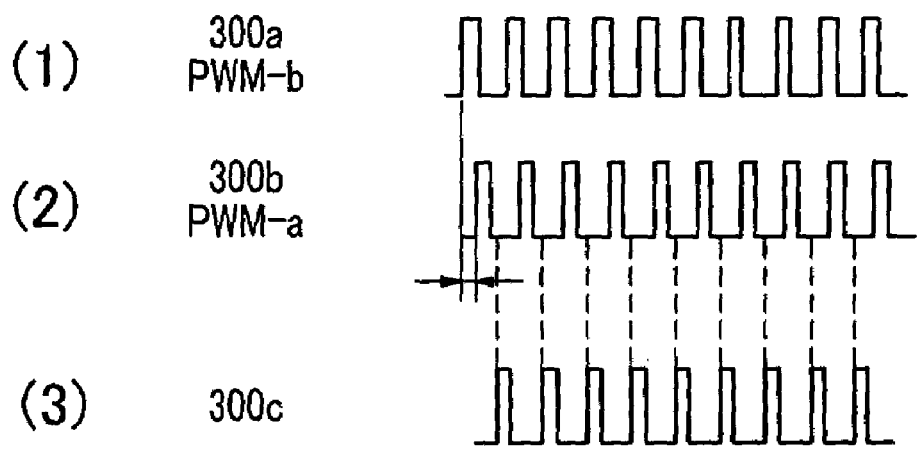
FIG. 12 is a diagram showing still other examples of reference triangular waves and PWM signals.

The timers T100a, T100b and T100c, preset in the above-described manner, permit generation of PWM signals 300a, 300b and 300c, as illustratively shown in sections (1), (2) and (3) of FIG. 12. In sections (1), (2) and (3) of FIG. 12, the horizontal axis represents the passage of time, while the vertical axis represents the voltage level. The switching elements of the two drive circuits are driven with the PWM signals of pulse widths set by the timers T101a, T101b and T101c. At that time, the drive circuits 144a and 144b would produce switching noise and the motor 19 would produce magnetostrictive sound. Because of the above-noted relationship in PWM control frequency among the timers T100a, T100b and T100c, the PWM switching timing differ as represented by the waveforms of the signals 300a, 300b and 300c, so that the noise peak levels generated by the switching can be reduced by virtue of level distribution attained by the differentiated switching timing. As a consequence, it is possible to lower the switching noise and magnetostrictive sound.

Figure 13:
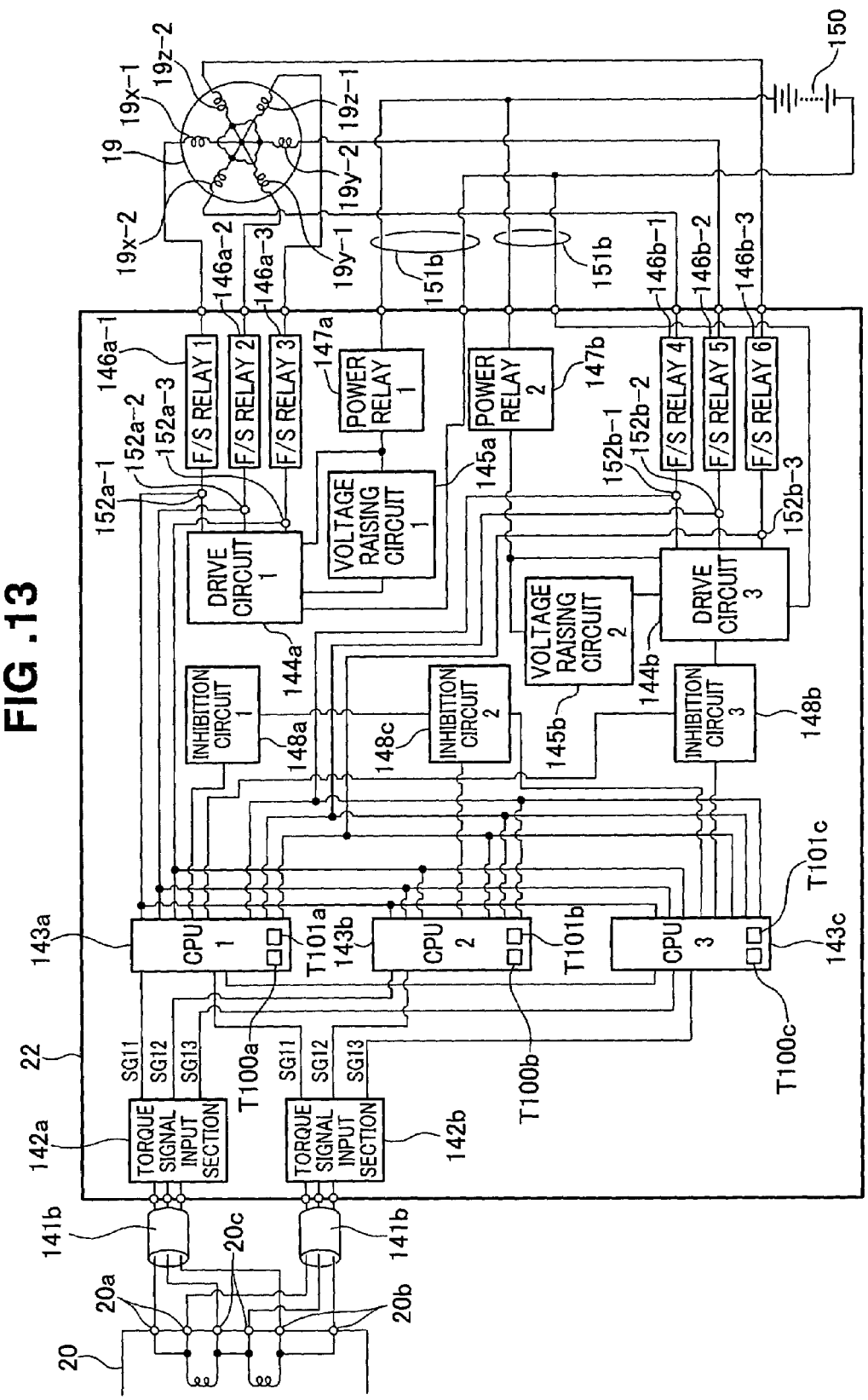
FIG. 13 is a block diagram showing a detailed setup of a controller device in another embodiment of the present invention.

Next, a description will be given about a detailed construction of the controller device 22 in accordance with a fourth embodiment of the present invention, with reference to FIG. 13. In FIG. 13, substantially the same elements as in the embodiment of FIG. 10 are denoted by the same reference characters as in FIG. 10, and will not be described avoid unnecessary duplication. Brushless motor 19 includes, as the stator coils, two sets of three-phase windings (19x-1, 19y-1, 19z-1) and (19x-2, 19y-2, 19z-2). Three-phase motor current output from the motor drive circuit 144a of the first motor drive channel is supplied to the windings 19x-1, 19y-1 and 19z-1, while a three-phase motor current output from the motor drive circuit 144b of the second motor drive channel is supplied to the windings 19x-2, 19y-2 and 19z-2. Specifically, the motor currents are supplied from the two motor drive circuits 144a and 144b to the brushless motor 19 simultaneously.

The motor drive circuits 144a and 144b of the driver device 22 are constructed as three-phase alternating current generating circuits, and thus the motor drive circuits 144a and 144b each have three three-phase alternating current output terminals. On the basis of combinations of desired two of the three output terminals in the motor drive circuit 144a forming the first motor drive circuit section (first motor drive channel), the motor current is supplied to power feed routes of the brushless motor 19 formed by the windings (19x-1, 19y-1), (19y-1, 19z-1), (19z-1, 19x-1) and the windings (19x-2, 19y-2), (19y-2, 19z-2), (19z-2, 19x-2). Similarly, on the basis of combinations of desired two of the three output terminals in the motor drive circuit 144b forming the second motor drive circuit section (second motor drive channel), the motor current is supplied to power feed routes of the brushless motor 19 formed by the windings (19x-1, 19y-1), (19y-1, 19z-1), (19z-1, 19x-1) and the windings (19x-2, 19y-2), (19y-2, 19z-2), (19z-2, 19x-2). Operational settings of the motor drive circuits 144a and 144b in the fourth embodiment are chosen appropriately as set forth above in relation to the third embodiment.

In the fourth embodiment, three motor current sensors (152a-1, 152a-2, 152a-3 or 152b-1, 152b-2, 152b-3), and three F/S relays (146a-1, 146a-2, 146a-3 or 146b-1, 146b-2, 146b-3) are provided for each of the three-phase-alternating-current generating motor drive circuits 144a and 144b.

The controller device 22 in accordance with the fourth embodiment of the present invention is characterized by the dual parallel sets of the electrical connection sections connecting from the steering torque detection section 20 to the controller device 22, motor drive circuit sections including the three-phase-alternating-current generating motor drive circuits 144a and 144b and power feed paths connecting from the battery 150 to the motor drive circuits 144a and 144b. Thus, in case a failure occurs in any one of the sets of the controller device 22, the remaining set allows the electric power steering apparatus to continue to work appropriately. Such redundant arrangements can effectively avoid an undesired system failure of the electric power steering apparatus.

In FIG. 13, settings of timers T100a, T100b and T100c are chosen to differ from one another so as provide different cyclic periods of reference triangular waves to be used for forming the PWM control pulses. For example, the timer T100a is set to provide a 18 kHz frequency of the reference triangular wave, the timer T100b is set to provide a 20 kHz frequency of the reference triangular wave, and the timer T100c is set to provide a 22 kHz frequency of the reference triangular wave. Namely, it is essential that the timers T100a, T100b and T100c be set to provide different cyclic periods of the reference triangular waves so as to prevent the PWM switching elements from being switched on and off at the same timing.

Figure 14:
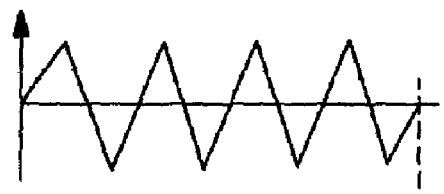
FIG. 14 is a diagram showing examples of reference triangular waves and PWM signals.
Figure 14:
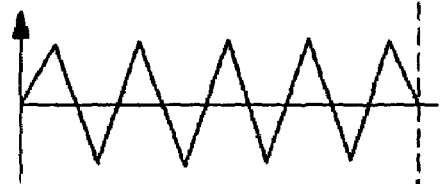
Figure 14:
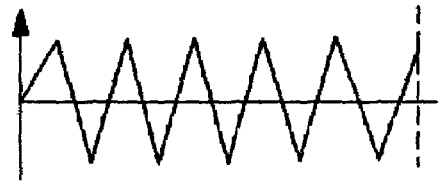

The timers T100a, T100b and T100c, preset in the above-described manner, permit generation of reference triangular waves 400a, 400b and 400c, as illustratively shown in sections (1), (2) and (3) of FIG. 14. The reference triangular waves 400a, 400b and 400c are compared, via comparators, to sinusoidal wave data that are voltage level instructions, to thereby generate switching signals. The switching elements of the two drive circuits 144a and 144b are driven by the thus-generated switching signals. At that time, the drive circuits 144a and 144b would produce switching noise and the motor 19 would produce magnetostrictive sound. Because of the above-noted relationship among the settings of the timers T100a, T100b and T100c, i.e. among the frequencies of the reference triangular waves, so that the switching timing differ between the drive circuits as represented by the waveforms of the reference triangular waves 400a, 400b and 400c and thus the peaks of the switching noise levels can be reduced by virtue of level distribution attained by the differentiated switching timing. As a consequence, it is possible to lower the switching noise and magnetostrictive sound.

In an alternative, the timers T100a, T100b and T100c for setting the cyclic periods of the PWM control pulses are set to the same settings, with the timers T100b and T100c being imparted with different phase offsets. For example, the timer T100a is set to provide a 20 kHz PWM frequency, the timer T100b is set to provide a 20 kHz PWM frequency, and a given phase offset is imparted to the timer T100b. Also, the timer T100c is set to provide a 20 kHz PWM frequency, and a phase offset different from the offset of the timer T100b is imparted to the timer T100c. In other words, the timers T100a, T100b and T100c are set to provide the same frequency, but different phases, of the reference triangular waves, so as to prevent the PWM switching elements from being switched on and off at the same timing.

Figure 15:
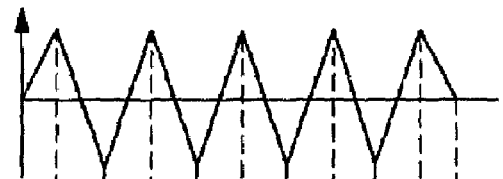
FIG. 15 is a diagram showing still other examples of reference triangular waves and PWM signals.
Figure 15:
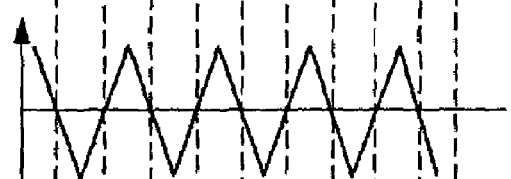
Figure 15:

The timers T100a, T100b and T100c, preset in the above-described manner, permit generation of triangular waves of cyclic periods determined by the preset data and hence generation of reference triangular signals 500a, 500b and 500c, as illustratively shown in sections (1), (2) and (3) of FIG. 15. The reference triangular waves 500a, 500b and 500c are compared, via comparators, to sinusoidal wave data that are voltage level instructions, to thereby generate switching signals. The switching elements of the two drive circuits 144a and 144b are driven by the thus-generated switching signals. At that time, the drive circuits 144a and 144b would produce switching noise and the motor 19 would produce magnetostrictive sound. Because of the above-noted relationship among the settings of the timers T100a, T100b and T100c, i.e. among the frequencies of the reference triangular waves, the switching timing differ between the drive circuits as represented by the waveforms of the reference triangular waves 500a, 500b and 500c and thus the peaks of the switching noise levels can be reduced by virtue of level distribution attained by the differentiated switching timing. As a consequence, it is possible to lower the switching noise and magnetostrictive sound.

In summary, the present invention is characterized by differentiating, between the two motor drive circuits, the control frequency at which the switching element is switched on and off. With the inventive arrangement, the PWM switching timing of the switching elements of the drive circuits can be prevented from occurring at the same timing. As a result, the peaks of the switching noise levels can be effectively reduced by virtue of level distribution attained by the differentiated switching timing of the switching elements.

The present invention is also characterized by differentiating, between the two motor drive circuits, the phase of the pulse signal for switching on and off the switching element. With the inventive arrangement, the PWM switching timing of the switching elements of the drive circuits can be prevented from occurring at the same timing. As a result, the peaks of the switching noise levels can be effectively reduced by virtue of level distribution attained by the differentiated switching timing of the switching elements.

Obviously, various minor changes and modifications of the present invention are possible in the light of the above teaching. It is therefore to be understood that within the scope of the appended claims the invention may be practiced otherwise than as specifically described.

What is claimed is:

1. A steering apparatus of a motor vehicle having a pair of steerable wheels that are manually steerable by a driver, comprising:
    first and second motors each generating a steering assisting force to be applied to a manual steering system of the motor vehicle that is connected to the steerable wheels to assist the driver's manual steering effort in steering the steerable wheels;
    first and second drive circuits for PWM-controlling said first and second motors, respectively, each of said first and second drive circuits including a switching element switched on and off at a control frequency; and
    a control system connected to the first and second drive circuits and producing a first control signal at a first control frequency at which said switching element of the first drive circuit is switched on and off and a second control signal at a second control frequency at which said switching element of said second drive circuit is switched on and off, wherein the first control frequency has a value that is greater than the second control frequency.

2. The steering apparatus of claim 1, wherein the control system comprises a controller that produces the first and second control signals.

3. The steering apparatus of claim 1, wherein the control system comprises a first controller that produces the first control signal and a second controller that produces the second control signal.

4. The steering apparatus of claim 1, further comprising a steering torque detector that inputs a steering torque signal to the control system and a vehicle velocity detector that inputs a vehicle velocity signal to the control system.

5. A steering apparatus of a motor vehicle having a pair of steerable wheels that are manually steerable by a driver, comprising:

first and second motors each generating a steering assisting force to be applied to a manual steering system of the motor vehicle that is connected to the steerable wheels to assist the driver's manual steering effort in steering the steerable wheels;

first and second drive circuits for PWM-controlling said first and second motors, respectively, each of said first and second drive circuits including a switching element switched on and off by a pulse signal; and a control system connected to the first and second drive circuits and producing a first pulse signal at a first phase for switching on and off said switching element of the first drive circuit and producing a second pulse signal at a second phase for switching on and off said switching element of the second drive circuit, wherein the first phase is offset from the second phase.

6. The steering apparatus of claim 5, wherein the first and second pulse signals are provided with the same frequency.

7. The steering apparatus of claim 5, wherein the control system comprises a controller that produces the first and second pulse signals.

8. The steering apparatus of claim 5, wherein the control system comprises a first controller that produces the first pulse signal and a second controller that produces the second pulse signal.

9. The steering apparatus of claim 5, further comprising a steering torque detector that inputs a steering torque signal to the control system and a vehicle velocity detector that inputs a vehicle velocity signal to the control system.

* * * * *